United States Patent
Wang et al.

(10) Patent No.: US 9,895,657 B2
(45) Date of Patent: Feb. 20, 2018

(54) HIGH-EFFICIENCY METHOD FOR REMOVING SULFUR AND MERCURY OF COAL-FIRED FLUE GAS, AND APPARATUS THEREOF

(71) Applicant: Chinese Research Academy of Environmental Sciences, Beijing (CN)

(72) Inventors: Fan Wang, Beijing (CN); Yu Liu, Beijing (CN); Fan Zhang, Beijing (CN); Gang Tian, Beijing (CN); Hongmei Wang, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 52 days.

(21) Appl. No.: 14/891,092

(22) PCT Filed: Sep. 25, 2013

(86) PCT No.: PCT/CN2013/084209
§ 371 (c)(1),
(2) Date: Nov. 13, 2015

(87) PCT Pub. No.: WO2014/183364
PCT Pub. Date: Nov. 20, 2014

(65) Prior Publication Data
US 2016/0082385 A1    Mar. 24, 2016

(30) Foreign Application Priority Data

May 14, 2013    (CN) .......................... 2013 1 0176721

(51) Int. Cl.
*B01D 53/50*    (2006.01)
*F23J 15/04*    (2006.01)
(Continued)

(52) U.S. Cl.
CPC .......... *B01D 53/502* (2013.01); *B01D 53/10* (2013.01); *B01D 53/50* (2013.01); *B01D 53/64* (2013.01); *B01D 53/83* (2013.01); *F23J 15/04* (2013.01); *B01D 2251/404* (2013.01); *B01D 2253/10* (2013.01); *B01D 2257/302* (2013.01);
(Continued)

(58) Field of Classification Search
None
See application file for complete search history.

(56) References Cited

U.S. PATENT DOCUMENTS 5,401,481 A * 3/1995 Rochelle .............. B01D 53/508
106/710
5,614,158 A * 3/1997 College ................ B01D 53/501
423/166

(Continued)

FOREIGN PATENT DOCUMENTS

CN  PCT/CN2013/084209    9/2013

*Primary Examiner* — Sheng H Davis
(74) *Attorney, Agent, or Firm* — Han IP Corporation; Andy M. Han

(57) ABSTRACT

A high-efficiency method for removing sulfur and mercury of coal-fired flue gas, and an apparatus thereof. The method comprises: activating, by using water vapor, lime or $Ca(OH)_2$ used as a sulfur removal and mercury removal absorbent and mixing the lime or $Ca(OH)_2$ with flue gas; conveying, by using water vapor, part of a by-product to a top of a reaction tower and mixing the part of the by-product with the flue gas, so as to strengthen the sulfur removal and mercury removal effect; the flue gas entering a bag type or electric bag compound dust remover after sulfur removal and mercury removal in the reaction tower, and conveying part of the collected by-product to the reaction tower for cycle use.

4 Claims, 2 Drawing Sheets

(51) Int. Cl.
*B01D 53/10* (2006.01)
*B01D 53/83* (2006.01)
*B01D 53/64* (2006.01)

(52) U.S. Cl.
CPC . *B01D 2257/602* (2013.01); *B01D 2258/0283* (2013.01); *F23J 2215/20* (2013.01); *F23J 2215/60* (2013.01); *F23J 2217/101* (2013.01); *F23J 2217/102* (2013.01); *F23J 2219/40* (2013.01)

(56) References Cited

U.S. PATENT DOCUMENTS

| | | | | |
|---|---|---|---|---|
| 5,961,837 | A * | 10/1999 | Ferrara | B01D 53/60 210/696 |
| 6,042,636 | A * | 3/2000 | Aishima | B01D 53/70 95/219 |
| 6,523,811 | B1 * | 2/2003 | Kumada | B01D 53/1412 261/115 |
| 8,715,600 | B1 * | 5/2014 | Gayheart | B01D 53/83 422/168 |
| 2005/0244317 | A1 * | 11/2005 | Ahman | B01D 53/508 423/122 |
| 2008/0060519 | A1 * | 3/2008 | Maly | B01D 53/10 95/107 |
| 2010/0293847 | A1 * | 11/2010 | Firey | C10L 1/326 44/607 |
| 2014/0205521 | A1 * | 7/2014 | Neumann | C01D 7/07 423/209 |

* cited by examiner

HIGH-EFFICIENCY METHOD FOR REMOVING SULFUR AND MERCURY OF COAL-FIRED FLUE GAS, AND APPARATUS THEREOF

CROSS REFERENCE TO RELATED APPLICATIONS

This is the U.S. national stage application of International Patent Application No. PCT/CN2013/084209, filed on 25 Sep. 2013, which claims the priority benefit of China Patent Application No. 201310176721.3, filed on 14 May 2013. The above-identified applications are hereby incorporated by reference in their entirety.

TECHNICAL FIELD

The present invention belongs to the technical field of environmental pollution control, and more particularly relates to a high-efficiency method for removing sulfur and mercury of coal-fired flue gas and an apparatus thereof.

BACKGROUND

China is the country with the largest emissions of $SO_2$ and mercury in the world, with about 75% of the $SO_2$ emission and 65% of the mercury emission resulting from coal combustion. As the pollution situation caused by coal combustion is very serious, China is also very concerned about mercury-based heavy metal pollution prevention in addition to focusing on managing coal-fired $SO_2$, $NO_x$ and particulate pollution. A single technology is mostly adopted for controlling different pollutants at home and abroad, for example, the flue gas mercury removal technology developed by the National Energy Technology Laboratory (NETL) of the United States has a mercury removal rate of up to about 90% due to the use of activated carbon injection and dust removal technologies, however, industrialized popularization and application are difficult for this technology due to its high cost of investment, high cost of activated carbon and great difficulty in eluting activated carbon. Furthermore, it may result in issues such as mismatching among various equipment, high cost of comprehensive investment, large covering area, high operation cost and inconvenient maintenance because different management equipment is used for controlling different pollutants.

Concerning the issues stated above, domestic and foreign technicians are devoted to researching on the combinations of multiple techniques that are capable of removing $SO_2$ and mercury at the same time. A method for removing mercury substances from hot flue gas invented by Foster Wheeler Energy Corporation in the United States, in which mercury in the hot flue gas is oxidized into $HgCl_2$ by injecting a chloride salt solution into the gas flue, it can realize simultaneous removal of $NO_x$ and $SO_2$ in combination with flue gas denitration and wet sulfur removal technologies. However, this technology is unstable in zerovalent mercury oxidization efficiency, and so far, has not yet been reported in industrialized applications.

A new flue gas purification technology invented by Ebara Corporation in Japan in which an electron beam irradiation method is employed, is featured by causing $N_2$, $O_2$, and $H_2O$ in the flue gas to produce large amounts of free radicals through the use of energy from high-energy electron beams to oxidize $SO_2$ and zerovalent mercury in the flue gas, and also by generating ammonium sulfate by reaction of ammonia with an acid and recycling the reaction products. But it is difficult for this technology to be industrially applied at present since large radiological protection facilities are necessitated, operating cost is high, and energy consumption and maintenance work are great.

In China, such a technology is being developed that $O_3$ produced by an electrostatic precipitator is utilized to oxidize zerovalent mercury in flue gas into soluble divalent mercury, combined control of multiple pollutants of denitration, sulfur removal and mercury removal can be realized in combination with the wet sulfur removal technology. Currently, this technology is still under development, and further research on the stability of mercury removal efficiency is also needed.

The technology for multi-pollutant control by adding metal chelates in wet flue gas desulfurization (FGD), which is researched and developed by American Dravo, can realize removal of sulfur and mercury by adding the metal chelates into traditional wet FGD solutions, and can achieve regeneration of absorbents only through reduction of trivalent ferric-chelates. However, with complex regeneration process of absorbents, high operating cost and poor removal efficiency of zerovalent mercury vapor, this process has not yet realized industrial application, either.

Thus, it has become an important issue in the current atmospheric pollution control field how to make full use of the existing pollutant control technologies to research and develop a practical technology of multi-pollutant control suitable for national conditions in China.

SUMMARY

Regarding the shortcomings in the prior art, an objective of the present invention is to provide a method for removing sulfur and mercury of coal-fired flue gas, which has advantages of high efficiency, low investment and low operating cost.

Another objective of the present invention is to provide an apparatus for removing sulfur and mercury of coal-fired flue gas, which has the advantages of high efficiency, low investment and low operating cost and is applicable for processing flue gas from coal-fired boilers, kilns and waste incineration.

To achieve the abovementioned objects, the present invention adopts a technical solution described below.

A method for removing sulfur and mercury of coal-fired flue gas may include a number of steps.

A gas flue is water-sprayed in advance to cool the flue gas down to 72-78° C., and then the flue gas enters a reaction tower after being humidified and cooled.

A lime/$Ca(OH)_2$ absorbent is sprayed into the reaction tower through a water vapor conveyor and mixed with the flue gas, so that $SO_2$ in the flue gas reacts with the lime/$Ca(OH)_2$, and simultaneously, the lime/$Ca(OH)_2$ absorbent is activated into microporous fine particles by water vapor in the process of being conveyed by the water vapor, to adsorb mercury vapor in the flue gas.

A by-product produced from sulfur removal and mercury removal of the flue gas is collected with a bag type or electric bag compound dust remover. A part of the sulfur and mercury removal byproduct collected by the dust remover is conveyed, as a recycled absorbent, to an absorbent spraying inlet of the reaction tower through the water vapor conveyor, and mixed with the flue gas to then enter the reaction tower again for further sulfur removal and mercury removal of the flue gas.

The remaining sulfur removal and mercury removal by-product is conveyed outwards, and the purified flue gas is fed into a chimney through an induced draft fan and then discharged.

The flue gas is mixed with the absorbent and the recycled absorbent, and then fully mixed with particles through a flue gas distributor, to improve the mixing uniformity of the particles with $SO_2$ and mercury vapor.

The weight ratio of recycled absorbent to lime is 100:1-200:1, and the conveying time is 2-5 seconds.

The molar ratio of lime/$Ca(OH)_2$ to $SO_2$ is 1.2-1.5, and the conveying time of lime/$Ca(OH)_2$ is 2-5 seconds.

A large number of experimental results reveal that: a small amount of lime particles having diameters of more than 100 μm are collected at the bottom of the reaction tower, and these by-products are not suitable for use as a sulfur removal and mercury removal absorbent due to its less micropores as well as poor activity and properties of sulfur removal and mercury removal, thus these by-products are directly discharged; the by-product particles having diameters of less than 100 μm are mostly collected by the dust remover; this part of the by-product is substantially fly ash with large specific surface area of particles and rich micropores. Therefore, this part of the by-product can be used as the sulfur and mercury removal absorbent for cycle use.

Compared with the conventional absorbent conveying modes such as compressed air conveying, it can not only increase the rate of activation of the absorbent, but also the specific surface area of the absorbent can be improved by 25-35%, so that the sulfur removal rate of the absorbent is improved by 8-15% and the sulfur removal rate of mercury vapor is improved by 15-20%.

Many experiment studies indicate that the best effect is attained when the activating time of fly ash is within 2-5 seconds. Less micropores will be formed if the activating time is too short and micropores will be blocked off by fine particles if the activating time is too long.

The water vapor used by the water vapor conveyor is boiler waste hot water vapor of 0.3-0.5 MPa and 250-300° C.

Many experiment studies show that the activation effect of the absorbent is affected by vapor pressure and temperature. Upon analysis on the sulfur removal and mercury removal properties after activation of the absorbent, it is found that the absorbent activated by the water vapor of 0.3-0.5 MPa and 250-300° C. has the highest efficiency in sulfur removal and mercury removal.

The effective height H of the reaction tower is 20-24 meters, and the time for sulfur removal and mercury removal of the flue gas in the reaction tower is 4-6 seconds.

The height of the flue gas distributor is ½₀ of the total height of the reaction tower.

To achieve the abovementioned method for removing sulfur and mercury, the present invention provides an apparatus for removing sulfur and mercury from flue gas. The apparatus may include a reaction tower for removing sulfur from flue gas, and a bag type or electric bag compound dust remover connected with the reaction tower.

An absorbent spraying inlet, a recycled absorbent spraying inlet and a gas flue inlet are arranged on the top of the reaction tower. Coal-fired boiler flue gas is connected with the gas flue inlet through the gas flue. A water spraying inlet is arranged on the upper part of the reaction tower. The lower end of the reaction tower is provided with a flue gas outlet connected with the flue gas inlet of the bag type or electric bag compound dust remover.

Two outlets are provided on the lower end of the bag type or electric bag compound dust remover, with one connected with the recycled absorbent inlet through a by-product powder bin and a water vapor conveyor and the other connected with outward by-product conveying equipment. The upper end of the bag type or electric bag compound dust remover is provided with an outlet connected with a chimney through an induced draft fan.

A flue gas distributor is arranged between the absorbent spraying inlet on the top of the reaction tower and the water spraying inlet.

The height of the flue gas distributor is 1/20 of the total height of the reaction tower.

The apparatus adopts lime/$Ca(OH)_2$ as a sulfur removal absorbent and a recycled absorbent as an auxiliary sulfur removal absorbent. The sulfur-removed flue gas passes through the bag type dust remover, and the purified flue gas is fed into the chimney by the induced draft fan and then discharged. Activation of the sulfur removal absorbent is achieved by conveying the sulfur removal absorbent (containing lime and fly ash as main ingredients) through water vapor, as a result of which CaO is turned into $Ca(OH)_2$ with a higher sulfur removal activity. By water-spraying the gas flue in advance, the flue gas is mixed and reacted with $Ca(OH)_2$ after being cooled, which improves the sulfur removal effect. Plenty of microporous structures and active groups are generated by the sulfur removal absorbent in the process of water vapor conveying, thus improving the capability of adsorbing indissolvable gaseous zerovalent mercury. The active groups significantly improve catalytic adsorption of zerovalent mercury and increase the stability of mercury removal by-product. And meanwhile, divalent mercury is dissolved in water drops by spraying and adhered to the surface of particles to form granular mercury after collision with the sulfur removal absorbent. Most of the granular mercury is trapped by the bag type dust remover, so as to realize the purpose of mercury removal. Catalytic adsorption of zerovalent mercury is improved, and more than 30% of zerovalent mercury is converted into divalent mercury.

DETAILED DESCRIPTION OF PREFERRED EMBODIMENTS

Figure 1:
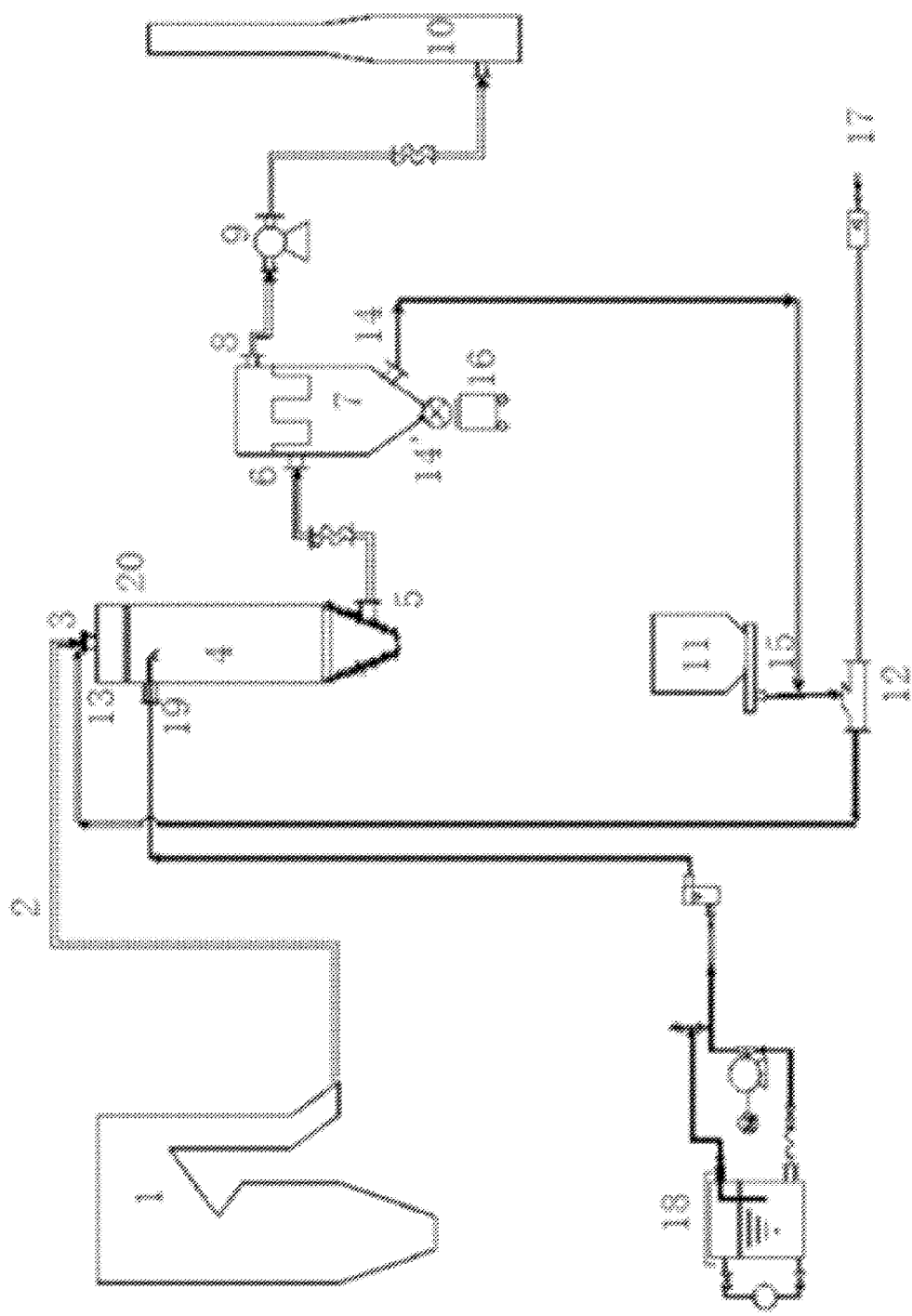
FIG. 1 is a system diagram of the apparatus for removing sulfur and mercury of flue gas in the present invention.
Figure 2:
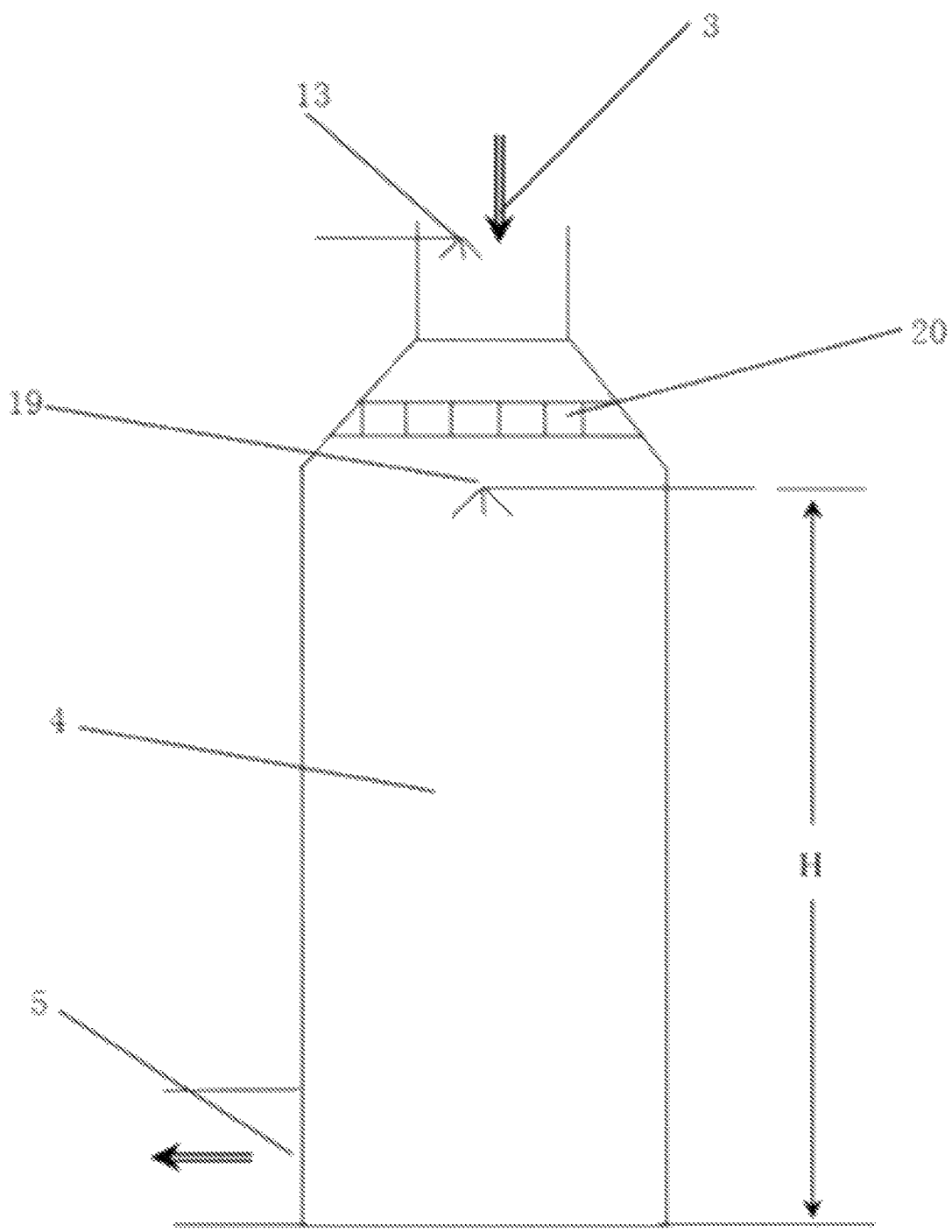
FIG. 2 is a schematic diagram of the structure of the reaction tower for removing sulfur and mercury in the present invention.

The present invention will be described in further detail below with regard to a coal-fired unit boiler with reference to the accompanying drawings:

The apparatus for removing sulfur and mercury in the present invention is structured as described below. As shown in FIGS. 1 and 2, an absorbent spraying inlet 13 and a gas flue inlet 3 are provided on the top of a reaction tower 4, a coal-fired boiler 1 is connected with the gas flue inlet 3 through a gas flue 2, and a water spraying inlet 19 is arranged on the upper part of the reaction tower 4; the water spraying inlet 19 is connected with a process water tank 18 through a water flow meter, a flue gas distributor 20 is arranged below the sulfur and mercury removal absorbent spraying inlet 13, and the lower end of the reaction tower 4 is provided with a flue gas outlet 5 connected with a dust remover outlet 6 of a bag type dust remover 7.

Two by-product outlets 14, 14' are provided on the lower end of the bag type dust remover 7, One by-product outlet 14 is connected with a recycled absorbent inlet 15, the other by-product outlet 14' is connected with outward by-product conveying equipment 16, and the upper end of the bag type dust remover 7 is provided with an outlet 8 connected with a chimney 10 through an induced draft fan 9. An absorbent powder bin 11 loaded with lime and the recycled absorbent inlet 15 are connected with the absorbent spraying inlet 13 through a water vapor conveyor 12.

Wherein coal-fired flue gas enters the reaction tower 4 through the gas flue inlet 3 on the upper part of the reaction tower 4, and waste hot water vapor 17 from the boiler is fed into the absorbent spraying inlet 13 on the top of the reaction tower after mixing the absorbent lime or $Ca(OH)_2$ in the absorbent powder bin 11 with the recycled absorbent, such as fly ash, in the recycled absorbent inlet 15. The flue gas is mixed with the lime or $Ca(OH)_2$ and the recycled absorbent at the flue gas distributor 20, humidifying water is mixed with the flue gas through the water spraying inlet 2, the humidified flue gas is subjected to sulfur and mercury removal reactions in the reaction tower 4, the flue gas enters the flue gas inlet 6 of the bag type dust remover 7 through the flue gas outlet 5 of the reaction tower 4 after sulfur removal and mercury removal, and the flue gas enters the chimney 10 through the outlet 8 after passing through the bag type dust remover 7 and is then discharged. A part of the by-product collected by the bag type dust remover 7 passes through the recycled absorbent outlet 14 and the recycled absorbent inlet 15 and enters the absorbent spraying inlet 13 on the top of the reaction tower 4 through the water vapor conveyor 12, and the other part of the by-product is directly discharged through the by-product outlet 14'.

In the process of removing sulfur and mercury from flue gas, firstly, the flue gas is cooled to 70-80° C. and then fed into the reaction tower 4, and meanwhile, the boiler waste hot water vapor of about 250° C. is used as a conveying power source, the water vapor is controlled to be below 0.5 MPa using a water vapor flowmeter, absorbent lime powders in the absorbent powder bin 11 and a part of the recycled absorbent collected by the dust remover 7 are conveyed to the absorbent spraying inlet 13 in the reaction tower 4 through the water vapor conveyor 12, then mixing with the flue gas and entering into the reaction tower 4. The concentration of the particulate matters in the flue gas of the reaction tower 4 can reach 200-300 g/Nm$^3$. The lime is activated and conveyed simultaneously in the process of being conveyed by the water vapor, with most of the lime being hydrated into strongly basic $Ca(OH)_2$. After $Ca(OH)_2$ reacts with $SO_2$ in the flue gas, a part of the by-product collected by the bag type dust remover 7 serves as an auxiliary sulfur removal and mercury removal absorbent for cycle use. The auxiliary sulfur removal and mercury removal absorbent is mixed with the lime through the recycled absorbent inlet 15, the mixture enters the absorbent spraying inlet 13 through the water vapor conveyor 12 to be mixed with the flue gas, and the resulting mixture enters the reaction tower 4 for further removal of $SO_2$ and mercury from the flue gas.

The working principle of the apparatus for removing sulfur and mercury in the present invention is as follows: most of the lime, when being conveyed by the water vapor, is hydrated into strongly basic $Ca(OH)_2$, while at the same time completing activation and conveying of the lime. $SO_2$ in the cooled flue gas within the reaction tower 4 reacts with $Ca(OH)_2$ in desulfurizer particles to generate $CaSO_2$, which is finally oxidized into $CaSO_4$. And meanwhile, microporous structures and large specific surface area generated in the process of conveying the absorbent can facilitate adsorption of $SO_2$ and gaseous mercury. Gaseous divalent mercury is partially dissolved in water drops and adhered to the surface of the particles to form particulate mercury after collision with the sulfur removal absorbent; after being conveyed, the absorbent contains a large amount of free metal oxides, achieving catalytic adsorption of zerovalent mercury. Removal of different forms of mercury is accomplished with the help of the bag type dust remover 7.

Embodiment 1

An experiment of this apparatus for removing sulfur and mercury is conducted in a 2t/h coal-fired experimental boiler 1, with the experimental system shown in FIG. 31. The reaction tower 4 for removing sulfur and mercury from flue gas has a dimension of φ1200 mm×7800 mm, the flue gas has a superficial velocity of 3.8 m/s, and the bag type dust remover 7 is arranged at the back of the reaction tower 4 for removing sulfur and mercury, with an aim of collecting the reaction by-product. Raw coals from Datong City, Shanxi Province are employed for experimental research. The part by percentage of sulfur in coal is 0.32%, and the content of mercury in coal is 0.35 mg/kg.

The temperature of the flue gas entering the reaction tower 4 is 128° C., the concentration of $SO_2$ is 578 mg/Nm$^3$, and the concentration of mercury vapor is 21.6 μg/Nm$^3$. The temperature of the flue gas exiting the reaction tower is kept at 75° C. by spraying water to the reaction tower, and the concentration of the particulate matters inside the reaction tower 4 is 250 g/Nm$^3$ after sulfur removal and mercury removal. The results show that the sulfur removal efficiency is up to 89.6% when the molar ratio of Ca/S is less than 1.2, the efficiency of removing gaseous divalent mercury is up to 91.6%, the efficiency of removing gaseous zerovalent mercury is up to 86.8%, the efficiency of removing gaseous total mercury is up to 89.2%, and the solid mercury trapping rate is up to 99.3%.

Embodiment 2

An 85t/h coal-fired boiler 1 is employed. The content of sulfur in coal is 0.5%, and the content of mercury in coal is 0.11 mg/kg. The temperature of the flue gas at outlet is 139.9° C., with the amount thereof being 234000-236000 Nm$^3$/h and the concentration of $SO_2$ in the flue gas being 920 mg/Nm$^3$. By adopting the apparatus for removing sulfur and mercury from flue gas in the present application as shown in FIG. 1, physical and chemical properties of the by-product have been changed significantly after the by-product is conveyed by the water vapor. CaO is partially converted into $Ca(OH)_2$ of a porous structure, which improves the adsorption capability of the absorbent to mercury. The temperature of the flue gas after sulfur removal and dust removal is 76-79° C. When the molar ratio of $CaO/SO_2$ is less than 1.2, the concentration of $SO_2$ in the processed flue gas is 89 mg/Nm$^3$, and the sulfur removal efficiency is up to 89.3%. About 98.6% of mercury vapor in the flue gas can be removed by this apparatus in combination with the bag type dust remover 7, and the content of mercury in the by-product can reach 1.58 mg/kg. The performance in removing various forms of mercury is comparable to the effect of removing mercury with activated carbon reported in foreign countries, and the operating cost is significantly lower than those of special technologies for removing mercury through activated carbon injection.

INDUSTRIAL APPLICABILITY

Compared with the existing methods and apparatuses for removing sulfur and mercury, the method for removing sulfur and mercury from flue gas and the apparatus thereof in the present invention have advantages described below.

(1) In the method of the present invention, lime/$Ca(OH)_2$ is used as a sulfur removal and mercury removal absorbent and a recycled absorbent is used as an auxiliary absorbent. The flue gas is cooled by water-spraying the flue gas in advance, and this is favorable for conversion of mercury vapor into solid mercury, which is collected by the dust remover in the back; most of divalent mercury is dissolved in water drops, and then adhered to the surface of and inner side of the micropores of the particles of the absorbent and the recycled absorbent after collision therewith; the absorbent and the recycled absorbent both have larger specific surface areas and high porosities and therefore have a strong adsorption capability for mercury vapor and also outstanding absorptive effects for various forms of mercury; meanwhile, it is advantageous for the zerovalent mercury absorbed by the recycled absorbent to be converted into divalent mercury under the catalytic oxidation effect of MgO and $Fe_2O_3$, and finally, the gaseous zerovalent mercury in the flue gas is converted into solution-state or granular mercury and then collected by the bag type or electric bag compound dust remover.

(2) Micropores on the surface of the recycled absorbent tend to adsorb finer particles to block off micropore channels. When the recycled absorbent is conveyed by the water vapor, the water vapor can activate the recycled absorbent so that these fine particles are released to generate more micropores; meanwhile, Ca, Si and Al that exist in the recycled absorbent will undergo a pozzolanic reaction under the effect of water vapor, so as to generate calcium silicate hydrate ($CaO.SiO_2.H_2O$), dicalcium silicate hydrate ($2CaO.SiO_2.H_2O$) and tetracalcium aluminate hydrate ($4CaO.Al_2O_3.13H_2O$). All these materials have high specific surface areas. And also, when the hydrates come into contact with hot flue gas, water in these hydrates is released and more pores are generated to increase the specific surface area of the recycled absorbent, endowing the recycled absorbent with outstanding mercury removal capability.

(3) The specific surface area and micropores of the particles are increased greatly after the recycled absorbent is mixed with lime. These microporous particles are conducive to absorption of $SO_2$ and mercury vapor in the flue gas and the efficiency of sulfur removal and mercury removal is improved accordingly.

What is claimed is:

1. A method for removing sulfur and mercury of a coal-fired flue gas, comprising:
   water-spraying a flue gas to cool the flue gas to 72-78° C. in by humidifying and cooling the flue gas before the flue gas entering a reaction tower;
   spraying a Ca(OH)2 absorbent into the reaction tower through a water vapor conveyor to mix the Ca(OH)2 absorbent with the flue gas so that SO2 in the flue gas reacts with the Ca(OH)2 and, simultaneously, so that the Ca(OH)2 absorbent is activated into microporous fine particles by water vapor while conveyed by the water vapor to adsorb mercury vapor in the flue gas;
   collecting, by a dust remover, a fly-ash produced from sulfur removal and mercury removal from the flue gas;
   conveying a part of the flv ash collected by the dust remover, as a recycled flv ash, to an absorbent spraying inlet of the reaction tower through the water vapor conveyor;
   conveying outwards another part of the fly ash collected by the dust remover;
   feeding purified flue gas into a chimney through an induced draft fan to be discharged;
   mixing the recycled fly ash with the flue gas to produce a mixture that enters the reaction tower again for further sulfur removal and mercury removal from the flue gas;
   mixing the flue gas with the Ca(OH)2 absorbed and the recycled fly ash, and then fully mixing with the particles through a flue gas distributor, to produce a mixed and uniform distribution of the particles with SO2 and mercury vapor,
   wherein an effective height of the reaction tower is 20-24 meters,
   wherein a time for sulfur removal and mercury removal of the flue gas in the reaction tower is 4-6 seconds,
   wherein the water vapor used by the water vapor conveyor is waste water vapor from a boiler of 0.3-0.5 MPa and 250-300° C. and
   wherein a catalyst with MgO and $Fe_2O_3$ is added to the $Ca(OH)_2$ absorbent.

2. The method for removing sulfur and mercury of a coal-fired flue gas according to claim 1, wherein a weight ratio of the recycled fly ash to $Ca(OH)_2$ is 100:1-200:1, and wherein a conveying time is 2-5 seconds.

3. The method for removing sulfur and mercury of a coal-fired flue gas according to claim 1, wherein a molar ratio of $Ca(OH)_2$ to $SO_2$ is 1.2-1.5, and wherein a conveying time of $Ca(OH)_2$ is 2-5 seconds.

4. The method for removing sulfur and mercury of a coal-fired flue gas according to claim 1, wherein a height of the flue gas distributor is 1/20 of a total height of the reaction tower.

* * * * *